United States Patent [19]

Hama et al.

[11] Patent Number: 5,754,177

[45] Date of Patent: May 19, 1998

[54] METHOD AND APPARATUS FOR SELECTING AN EDIT OBJECT ON A DISPLAY SCREEN

[75] Inventors: Toshiyuki Hama, Tokyo-to; Kazuo Iwano, Yokohama; Shinji Misono, Tokyo-to, all of Japan

[73] Assignee: International Business Machine Corp., Armonk, N.Y.

[21] Appl. No.: 635,489

[22] Filed: Apr. 22, 1996

[30] Foreign Application Priority Data

Apr. 21, 1995 [JP] Japan ................................. 7-096934

[51] Int. Cl.$^6$ ................................................. G09G 5/14
[52] U.S. Cl. .............................. 345/339; 345/340; 345/353
[58] Field of Search .................................. 345/115, 118, 345/119, 120, 141; 395/133, 135, 339, 342

[56] References Cited

U.S. PATENT DOCUMENTS

| | | | |
|---|---|---|---|
| 5,001,697 | 3/1991 | Torres | 364/521 |
| 5,073,771 | 12/1991 | Satta et al. | 340/721 |
| 5,262,760 | 11/1993 | Iwamura et al. | 345/145 |
| 5,367,625 | 11/1994 | Ishitani | 395/159 |
| 5,377,314 | 12/1994 | Bates et al. | 395/135 |
| 5,418,899 | 5/1995 | Aoki et al. | 395/139 |
| 5,438,651 | 8/1995 | Suzuki et al. | 395/131 |
| 5,513,309 | 4/1996 | Meier et al. | 395/155 |
| 5,548,304 | 8/1996 | Yoshino et al. | 345/145 |
| 5,553,201 | 9/1996 | Muramatsu | 395/109 |
| 5,594,850 | 1/1997 | Noyama et al. | 395/135 |

*Primary Examiner*—Raymond J. Bayerl
*Assistant Examiner*—Matthew Luu
*Attorney, Agent, or Firm*—A. Bruce Clay

[57] ABSTRACT

An edit object is selected by displaying a plurality of edit objects such as figures or characters closely arranged or overlapped on a display screen. A pointer is used to specify a desired position on the main screen, and determine with a candidate selecting device whether or not a plurality of edit objects exists at a specified pointer position or in a predetermined region based on the specified position. If a plurality of edit objects exists, the edit objects existing at the position or in the predetermined region are selected as selective candidates. A subscreen is displayed on the display screen by a subscreen display device. The subscreen has a plurality of information regions which correspond to respective selective candidates. The pointer is moved on the subscreen, thus changing the display of the edit object on the main screen which corresponds to the information region indicated at the pointer position on the subscreen by highlighting or changing to a specific color. One of the information regions displayed on the subscreen is then specified by the input means.

32 Claims, 8 Drawing Sheets

METHOD AND APPARATUS FOR SELECTING AN EDIT OBJECT ON A DISPLAY SCREEN

FIELD OF THE INVENTION

The present invention relates to a method and apparatus for selecting a desired edit object displayed on a screen, and, more particularly, to a method and apparatus for virtually zooming a plurality of edit objects as selective candidates, and selecting a desired edit object based on the zoomed display.

BACKGROUND OF THE INVENTION

A method for selecting a desired one of a plurality of edit objects displayed on a screen with a pointing device such as a mouse or track ball which is a common input device includes moving a pointer to the display position of a desired edit object and directly specifying it. In another method, a pointer is moved near the display position of a desired edit object and a rectangle is formed surrounding the edit object for selection.

When graphics are generated using a common graphics application or a CAD application, an operator often performs an operation to select one of a plurality of edit objects such as figures or characters adjacently displayed, or an operation to select one of them displayed in an overlapped manner.

When a plurality of edit objects is closed, it is required to move the pointer exactly onto the display position of the desired edit object. The movement of the pointer is critical because another edit object may be erroneously selected by slightly moving the position of the pointer. Thus, it is an operation that is difficult for the operator. When a plurality of edit objects is overlapped, the system is generally designed to select the uppermost figure on the display screen. Thus, when it is intended to select a lower figure, an operation is required to change the vertical relationship between the overlapped figures so that the desired figure becomes the uppermost one. Such operation for change is troublesome for the operator.

Figure 1:
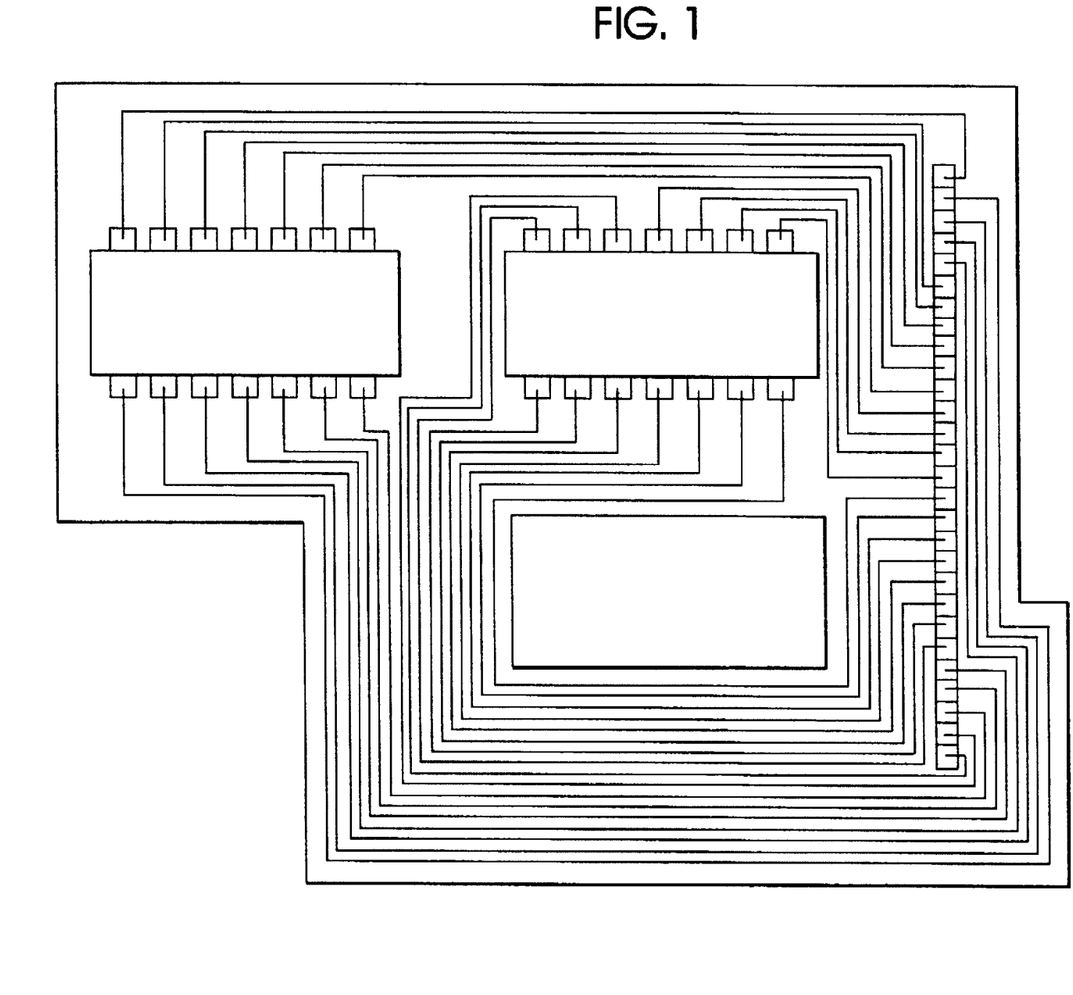
FIG. 1 is a wiring pattern of a printed circuit board.

FIG. 1 is a wiring pattern of a printed circuit board. When the wiring pattern shown in the Figure is edited, the operator is required to frequently perform the above-mentioned operations. This is because, as shown in FIG. 1, the wiring as edit objects is so closely arranged that delicate movement of the pointer is necessary in order to select a desired wiring portion. In addition, it is because an operation is necessary for changing the vertical relationship of respective layers since there is a case where respective layers constituting a multi-layer board are displayed in an overlapped state.

Thus, the operator is required to perform a difficult and/or troublesome operation when a plurality of figures exists in a complicated manner such as where the edit objects are closely arranged or overlapped. Then, the present invention is intended to improve the efficiency of the editing operation by enabling selection of a desired edit object in a display screen with an accurate and simple operation.

SUMMARY OF THE INVENTION

To solve the above object, the present invention provides a method for selecting a desired one of a plurality of edit objects such as figures or characters which are displayed in a closely arranged or overlapped manner. That is, it provides a method comprising the steps of displaying a plurality of edit objects in a main screen of a display screen, moving a pointer displayed in the main screen by input means so as to specify a desired position of the main screen, determining whether or not a plurality of edit objects exists at a specified pointer position or in a predetermined region based on the specified position and, if there exists a plurality of edit objects, selecting the edit objects existing at the position or in the predetermined region as selective candidates, displaying a subscreen in the display screen, the subscreen having a plurality of information regions, the respective information regions corresponding to respective selective candidates, moving the pointer in the subscreen by the input means, changing display of the edit object in the main screen which corresponds to the information region indicated at the pointer position in the subscreen to highlighting or a specific color, and specifying one of the information regions displayed in the subscreen by the input means, whereby one of the edit objects corresponding to the specified information region is selected.

In such an arrangement, the operator can easily select a desired edit object by moving the pointer in the subscreen while understanding the entire situation on the main screen. The operator can effectively select the desired object on the subscreen while confirming the entire arrangement in a drawing or the like in which edit objects with similar shapes are very closely and adjacently arranged.

The subscreen may be an extended screen within a predetermined region based on a position of the pointer specified in the main screen or a specified position, or may be constituted by combining a plurality of transparent tile-shaped information regions which only consist of contour. The tile-shaped information region may typically be a simple cell structure with the same shape of a triangle, rectangle, diamond, or hexagon. In addition, the shape of the information region may be changed depending on the attribute or shape of the edit object. The subscreen may be displayed overlapping on the main screen with a pop-up menu. If the subscreen is transparent, it is possible to effectively prevent situations in which display of the subscreen prevents the operator from confirming the entire arrangement.

Furthermore, also disclosed is an apparatus for selecting a desired one of a plurality of edit objects displayed in a display screen comprising means for displaying a plurality of the edit objects in the display screen, input means for moving and specifying a pointer displayed in the display screen to a desired position in the display screen, storage means for determining whether or not a plurality of edit objects exists at the position of the pointer specified by the input means or in a predetermined region in the display screen based on the specified position, if so, selecting and storing the edit objects at the position or in the predetermined region as selective candidates, display means for displaying a pop-up menu in the display screen, the menu having information regions in the same number as the selective candidates stored by the storage means, respective information regions corresponding to respective selective candidates stored by the storage means, means for moving the pointer in the menu with the input means to change the display of the edit objects in the display screen corresponding to the information region in accordance with the information region displayed at the position of the pointer in the menu thereby enabling the operator to recognize the corresponding edit object, and means for selecting the edit object corresponding to the specified information region by specifying any one of the information regions displayed in the menu with the input means.

BRIEF DESCRIPTION OF THE DRAWINGS

For a more complete understanding of the present invention, and for further advantage thereof, reference is now made to the following Detailed Description taken in conjunction with the accompanying drawings, in which.

DETAILED DESCRIPTION OF THE INVENTION

Figure 2:
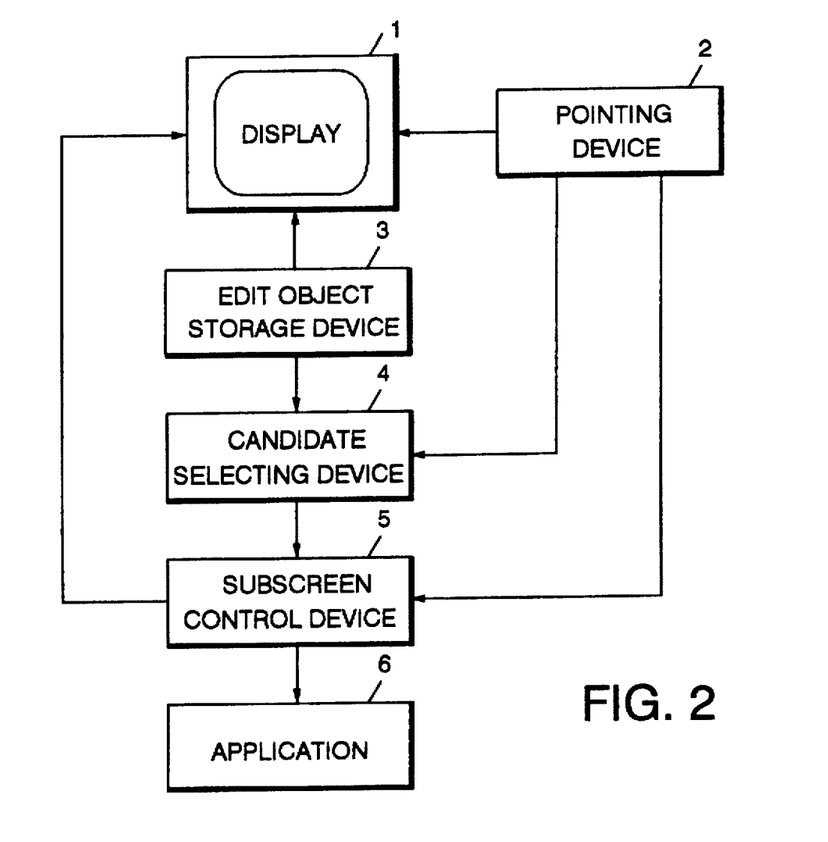
FIG. 2 is a block diagram showing the arrangement of a computer system in an embodiment of the present invention.

FIG. 2 is a block diagram showing the configuration of a system in an embodiment of the present invention. The system comprises a display 1 having a display screen, a pointing device 2 such as a mouse or track ball which is an input device, an edit object storage device 3, a candidate selecting device 4, a subscreen control device 5, and an application 6.

The display 1 is for displaying the screen in correspondence with a control signal. The pointing device 2 is a device for moving a pointer on the screen, and for specifying the position of the pointer. An output signal, in response to the control of the pointing device 2, is supplied to the display 1, the candidate selecting device 4 and the subscreen control device 5. The edit object storage device 3 is a device for storing information relating to the edit object being edited, and supplies to the display 1 and the candidate selecting device 4 an edit object signal corresponding to the information.

The candidate selecting device 4 receives information on the displayed figure from the edit object storage device 3. The information has a tag representing the type of figure (rectangle, circle, line, or character), coordinates of points constituting individual figures, and a data structure comprising strings (hereinafter called the "figure data"). In addition, the control signal from the pointing device 2 contains the coordinates pointed thereto on the display screen. The candidate selecting device 4 compares the region of a predetermined range based on the coordinate value or its position (hereinafter called the "specified region") with the figure data to select the figure data overlapping the specified region as a selective candidate.

The candidate object selected by the candidate selecting device 4 may be an edit object of all attributes, or one with a specific attribute such as a figure only. The candidate selecting device 4 supplies the number of selective candidates and the figure data as a selective candidate signal to the subscreen control device 5.

The subscreen control device 5 displays a subscreen in which information relating to all selective candidates is displayed in response to the selective candidate signal supplied from the candidate selecting device 4 in the display screen. At the moment, the subscreen control device 5 generates the figure data to be displayed in response to the individual selective candidates, and stores information in the form of a data structure adding the reference to figure data of a selective candidate to the generated figure data. In addition, the subscreen control device 5 obtains the coordinate value of the pointing device 2 with the control signal from it, selects a figure data containing the coordinates from the figure data displayed in the subscreen, and identifies the figure data for the selective candidate referenced in the data structure. The identified figure data is supplied to the display 1 as a control signal to change the display of the edit object corresponding to the selective candidate, or provided to the external application 6 as the selected figure.

The specified region is preset in the system, for example, such as a region on the screen represented by a circle with a diameter of 1 cm around the pointer or a square with a side of 1 cm. First, the present invention selects any and all edit objects which have even a part thereof contained in the set specified region as selective candidates, and finally selects a desired edit object by selecting any one of the selective candidates. Therefore, because it is necessary that a part of the desired edit object be contained in the specified region, it is important to establish the specified region so that the operation is easy for the operator.

The specified region may be set as a fixed value, or may be user adjustable. Furthermore, it may be set in such a manner that the specified region varies in connection with the display magnification of the screen. This would further improve the operability for the operator.

Figure 3:
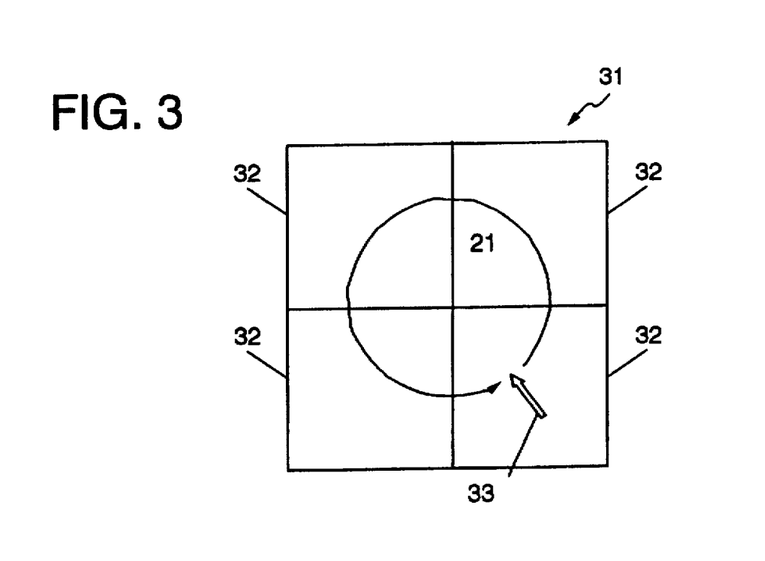
FIG. 3 is a subscreen in the embodiment of the present invention.

FIG. 3 shows a subscreen in accordance with the present invention. A subscreen 31 is overlappingly displayed on a main edit screen (not shown). The subscreen 31 may be displayed as, for example, a pop-up menu. The subscreen 31 comprises a plurality of information regions 32 in the same number as the selective candidates as determined by specifying the specified region. Respective information regions 32 correspond to respective edit objects. Each information region 32 is a transparent cell comprising only a square contour, and the subscreen combines the transparent cells. Therefore, even when a transparent subscreen for which only the cell contour is displayed is overlapped on the main screen, the operator's view is not obscured by the subscreen, and the entire main screen can be seen. FIG. 3 shows a subscreen 31 comprising four information regions 32 which are overlapped and displayed on the main screen when four edit objects are contained in the specified region.

When the subscreen 31 is displayed, the pointer 33 (which has been on the main screen) is automatically displayed on the subscreen 31. While the subscreen 31 is displayed, the pointer 33 is set to be freely movable only in the subscreen 31, and prohibited from movement outside the subscreen 31.

Then, the edit object in the main screen corresponding to the information region 32, indicated by the pointer 33 in the subscreen 31, is changed from a normal display state to a specific display state. The change is, for example, to highlight the contour of the corresponding edit object, or change its color to a specific color. When the operator moves the pointer 33, an edit object corresponding to an information region 32 to which the pointer no longer points, changes to the normal display state, and an edit object corresponding to an information region 32 to which the pointer newly points, changes to the specific display state.

The operator sequentially changes the display state of the edit object by suitably moving the pointer. Then, when the desired edit object changes the display state, the operator can select the desired edit object by specifying the information region 32. Thus, one need not know the correspondence between the information region and the edit object, yet can still easily select the desired edit object by suitably moving the pointer within the subscreen. It is preferable to use a transparent subscreen only with contour for the operator to confirm the edit object highlighted on the edit screen. In addition, since the system limits the movement of the pointer so that the pointer does not move outside the subscreen, the operator need not be aware of the subscreen and can concentrate on the main screen.

It is preferable that the border between the transparent information region and an adjacent information region be distinguishable to confirm the edit object by suitably moving it within the subscreen. Furthermore, because the subscreen is formed by combining the information regions, it is preferable that the information region have a simple shape. Accordingly, the information region is not necessarily a square, but may be a triangle, rectangle, diamond or hexagon. In essence, it is preferable that a plurality of edit objects near a point on the screen pointed to by the pointer are arranged as a menu by causing them to correspond to figures with a size which can be clearly distinguished and specified by the pointer. The information regions do not necessarily have the same shape, but may have different shapes depending upon the attribute or shape of the edit object.

The size of an information region displayed on the screen preferably satisfies the following relationship. That is, the shortest distance between the centers of two adjacent information regions is preferably larger than the distance between two closest edit objects displayed as selective candidates. In order for the operator to easily select one of the edit objects when they are close to each other, it is necessary to display the subscreen comprising the information region or a virtual zoomed screen thereby making movement of the pointer in the zoomed screen larger than in the edit screen. Erroneous selection of another adjacent edit object can be effectively prevented by making the amount of movement on the zoomed screen larger than the distance between the two closest on the edit screen.

Figure 4:
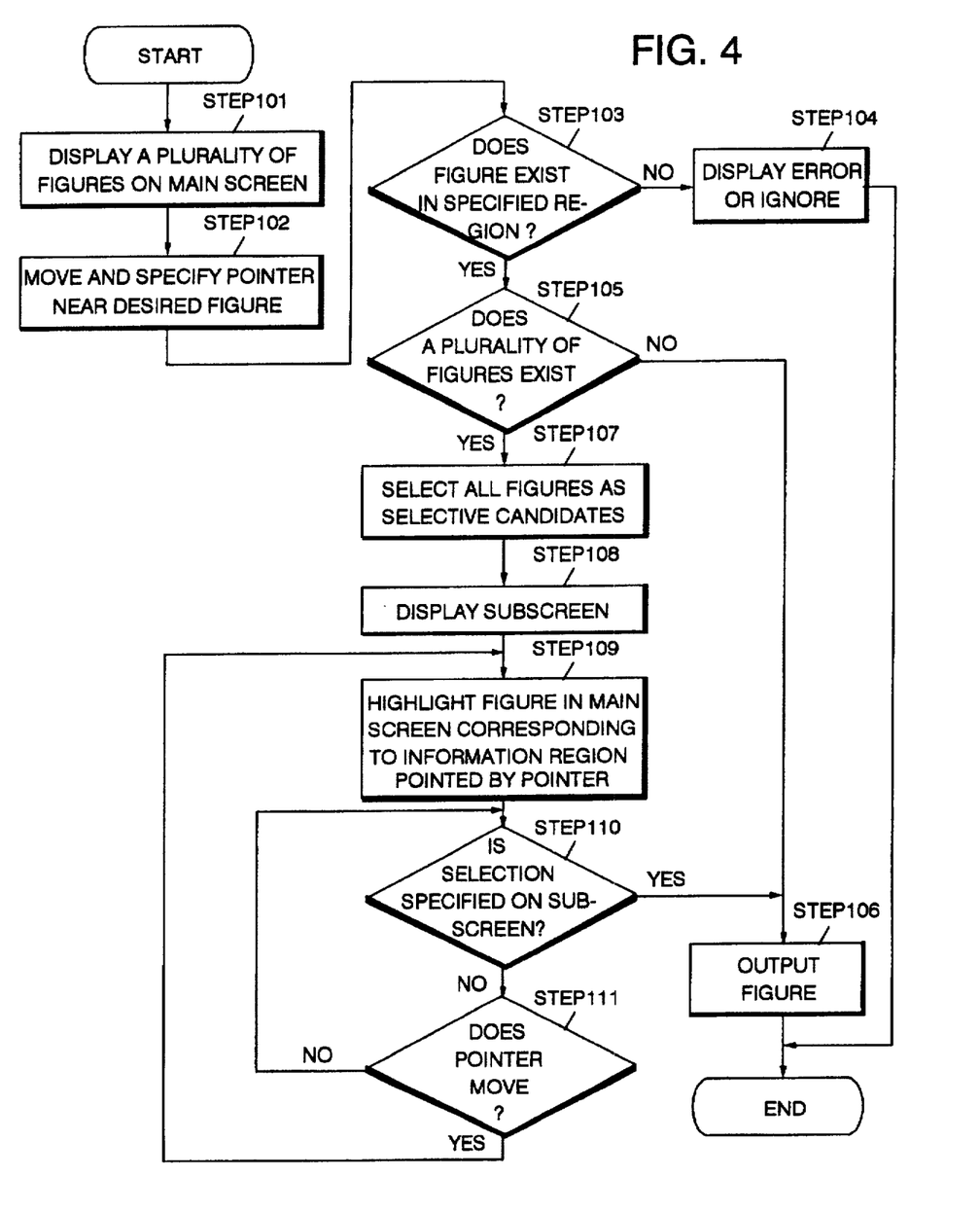
FIG. 4 is a flowchart illustrating steps for selecting an edit object in the embodiment of the present invention.

FIG. 4 is a flowchart illustrating steps for selecting an edit object in the embodiment of the present invention. The description is based on a plurality of figures which are typical examples of edit objects that exist in a close relationship.

First, a plurality of figures is displayed as a main screen on the display (step 101). Also displayed on the main screen is a pointer which can be freely moved by an input device. The input device freely moves the pointer displayed in the main screen, and the mouse is clicked near the position on the screen where a desired figure exists (step 102). That is, the mouse is clicked near the position where the desired figure is displayed. At that moment, the pointer does not necessarily point to the exact position where the desired figure exists.

The candidate selecting device determines whether or not the figure exists within the specified region as set by the above process (step 103). If not, the process displays an error message or ignores specification from the input device, and terminates (step 104). If the figure exists, the candidate selecting device determines whether or not a plurality of figures exists (step 105). If not, the process selects one figure in the specified region as the desired figure, and terminates after notifying an external application (step 106). If a plurality of figures exists, the candidate selecting device selects all figures as the selective candidates, and provides numbers in a suitable order. Then, the subscreen control device is notified (step 107).

The subscreen control device displays the subscreen on the main screen in an overlapped manner (step 108). The subscreen comprises a plurality of information regions corresponding to the number of selective candidates provided by the candidate selecting device. Respective information regions are caused to correspond to respective selective candidates. Then, the pointer is moved in the subscreen.

An edit object in the main screen corresponding to the information region which is pointed to by the pointer is highlighted (step 109). This allows the operator to visually recognize the corresponding edit object.

The operator determines whether or not the highlighted figure in the main screen is the desired figure. If so, a control signal is sent to the subscreen control device. If there is no such notification, the process waits for specification of selection if the pointer does not move (steps 110 and 111), and waits for specification of selection after update of the highlighted figure if the pointer moves (steps 109, 110, and 111). After receiving the signal indicating the selection of a figure, the subscreen control device selects the highlighted figure (step 106), and the process terminates after output to the external application.

Figure 5A:
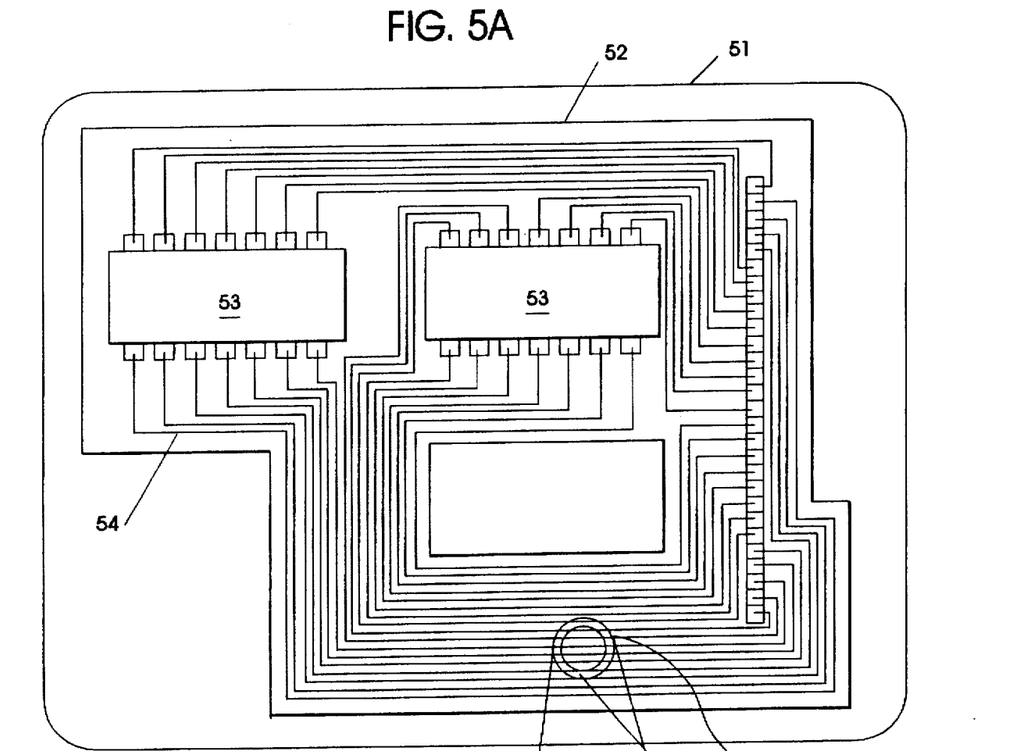
FIG 5A and 5B are schematic diagrams showing the arrangement of a subscreen corresponding to a selective candidate in the embodiment of the present invention.
Figure 5B:
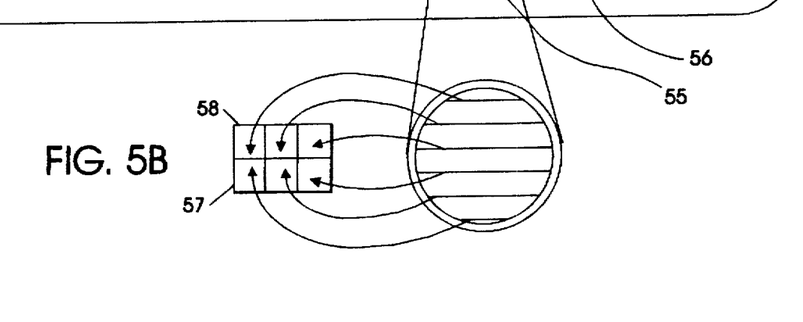
Figure 6:
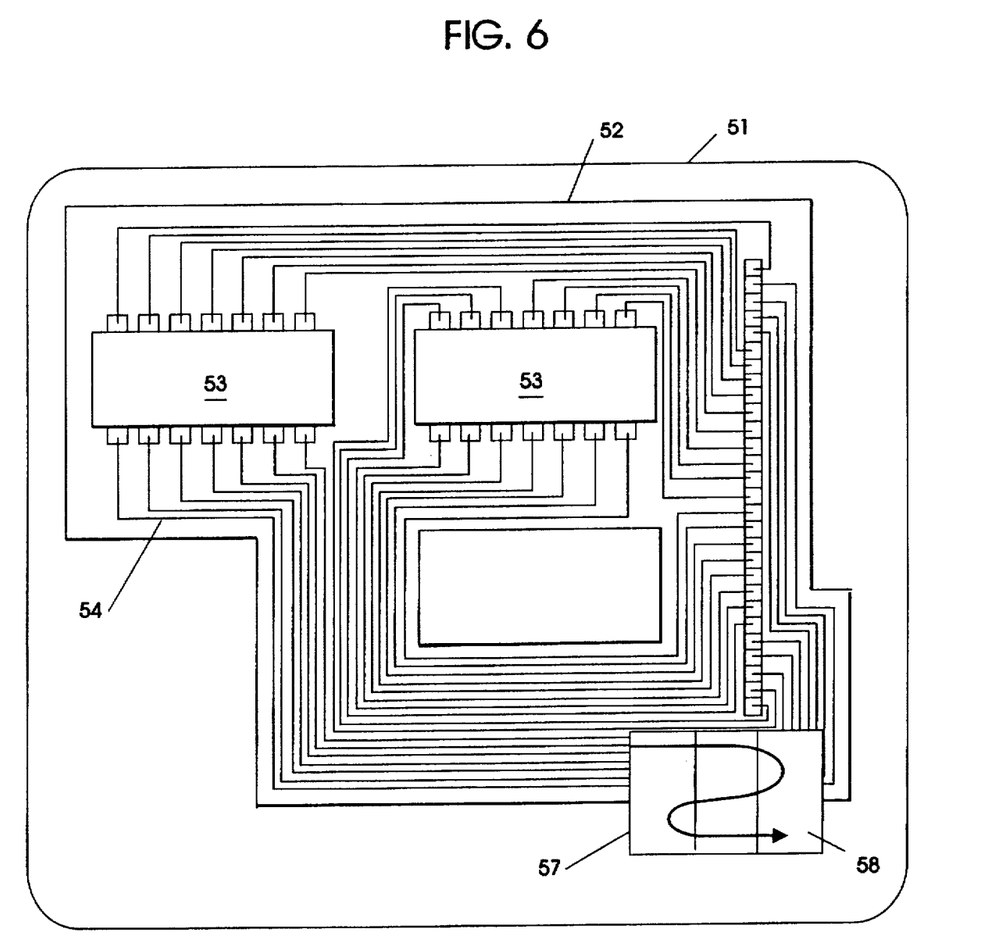
FIG. 6 is a schematic diagram showing movement of a pointer and highlighting of an edit object on the subscreen in the embodiment of the present invention.

FIGS. 5A and 5B schematically show the arrangement of a subscreen corresponding to the selective candidate in the embodiment of the present invention. Also, FIG. 6 schematically shows movement of the pointer on the subscreen and highlighting of the edit object in the embodiment of the present invention. These figures indicate a state where six portions of wiring are the selective candidates, and a subscreen having six information regions corresponding thereto is displayed.

The main screen 51 shows a wiring pattern diagram 52 of a printed circuit board comprising an IC chip 53 and a number of portions of wiring 54 created by CAD. When it is intended to select one of the portions of wiring existing in a dense region 56, the pointer is first moved near an area 55. However, it is not necessary for the pointer to point exactly to the desired one portion of wiring. When the area 55 near the position where the desired wiring exists is specified, six portions of wiring which are contained within a region of, for example, a circle 56 with a diameter of 1 cm are selected as selective candidates. A transparent subscreen is displayed as a pop-up menu on the main screen, and respective portions of wiring are caused to correspond to six respective information regions 58 on the subscreen 57. Then, when the pointer on the subscreen is moved, wiring in the main screen corresponding to the information region 58 which is pointed to by the pointer is sequentially highlighted.

Thus, the operator can select the desired wiring while confirming on the entire drawing in the main screen whether or not the highlighted wiring is the desired one. Therefore, even in editing a figure in which similar wiring is arranged in a similar manner, it can effectively prevent misunderstanding of the desired edit object. Furthermore, because a virtually zoomed subscreen is displayed, and an edit object is selected with movement of the pointer within the subscreen, erroneous selection which may occur with slight movement of the pointer is effectively prevented.

Figure 7:
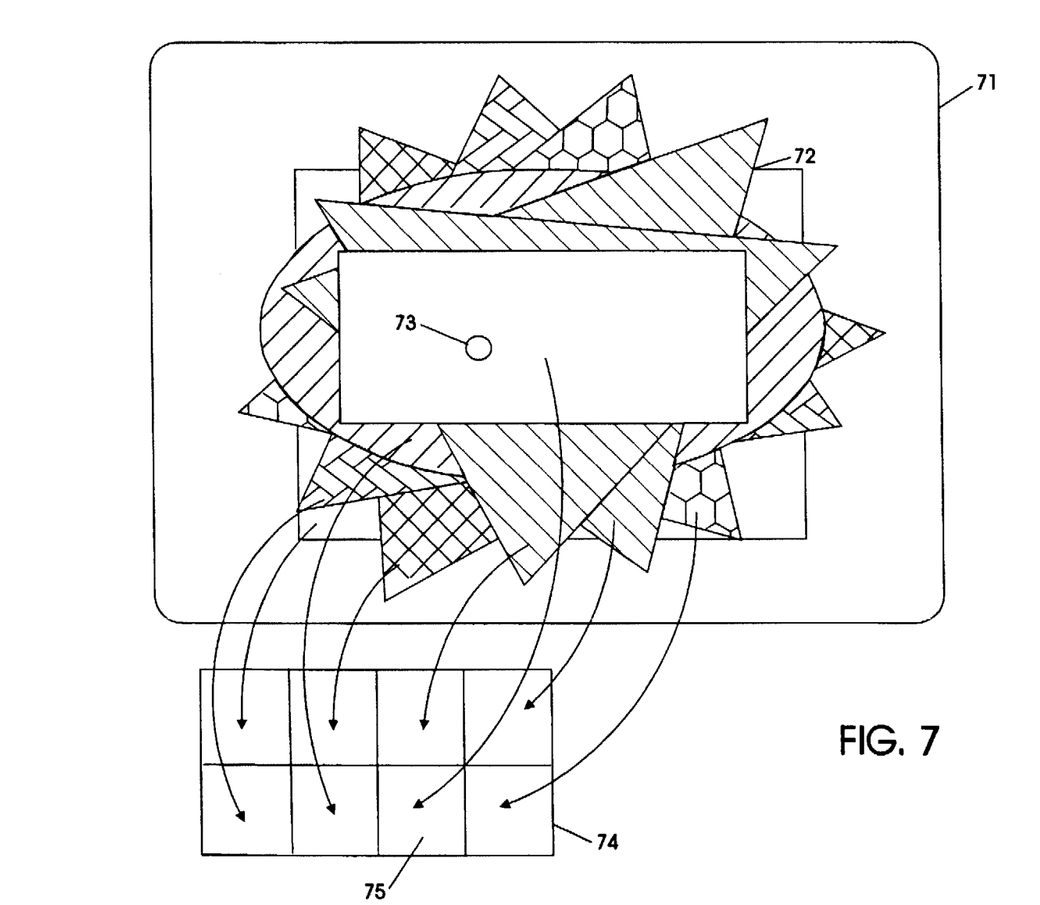
FIG. 7 is a diagram showing a state of the subscreen when a plurality of figures is overlapped.
Figure 8:
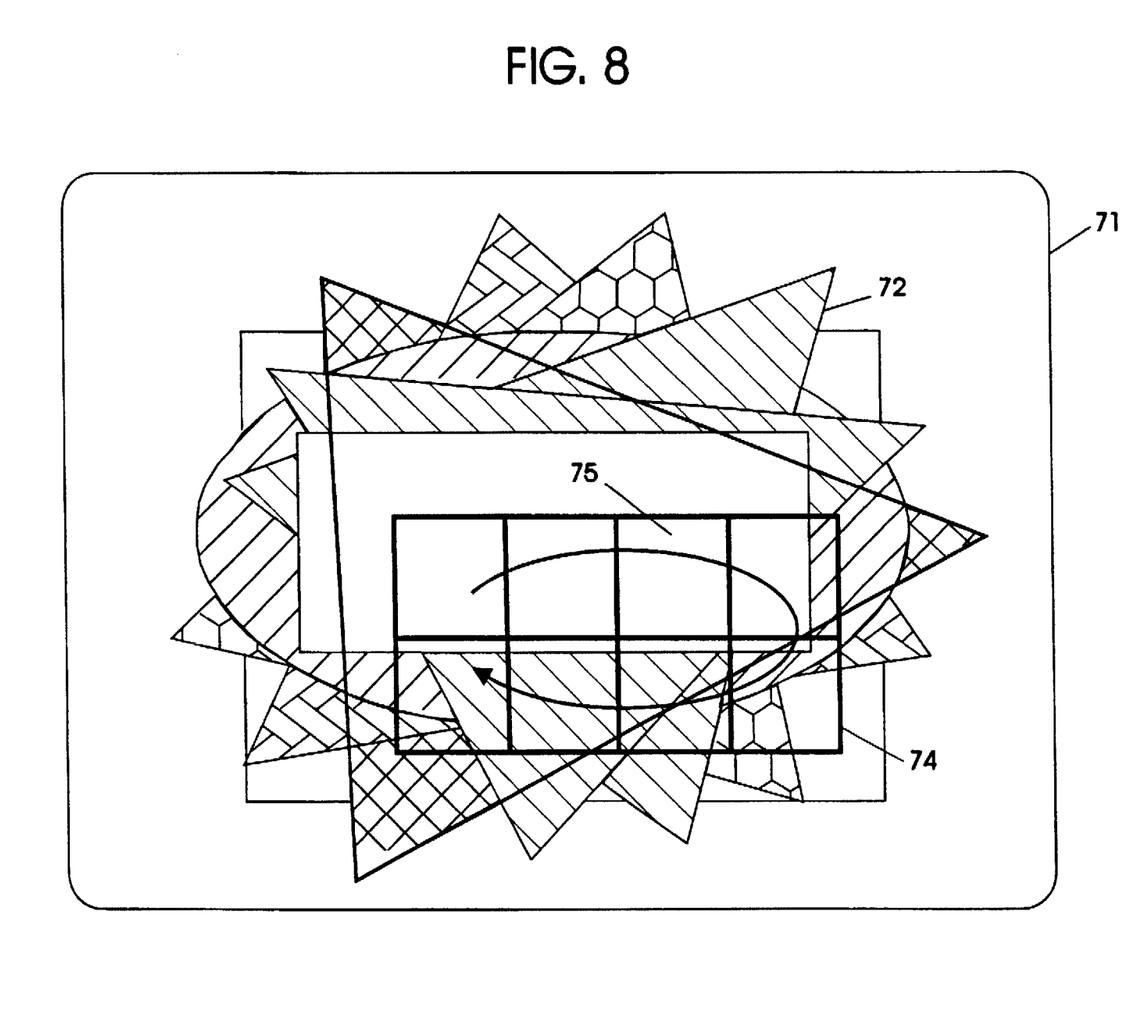
FIG. 8 is a schematic diagram showing movement of a pointer and highlighting of an edit object on the subscreen in the embodiment of the present invention.

Next, selection when the edit objects are overlapped is described with reference to FIGS. 7 and 8. FIG. 7 shows a subscreen where a plurality of figures are overlapped, while FIG. 8 schematically shows movement of the pointer on the subscreen and highlighting of the edit objects in the embodiment of the present invention.

Overlapped and displayed on a main screen 71 are eight FIGS. 72 generated by a typical graphics application. When it is intended to select one of the eight figures, the pointer is moved to an area 73. By specifying a position where a desired figure exists with an input device, eight figures including the desired figure that exist at that position are selected as the selective candidates. The selective candidates may be selected based upon a preset specified region as described above.

Respective selective candidates are given a number. The numbering may be, for example, according to the depth of each figure. Each selective candidate is caused to correspond to one of eight information regions 75 on the subscreen 74, and displayed as a pop-up menu. Then, the figure corresponding to the information region 75 which is pointed to by the pointer is highlighted by moving the pointer on the subscreen so that the desired figure can be easily selected.

Conventional graphics applications are set to select the uppermost figure for editing, therefore, it is necessary to change the vertical relationship to put the desired figure on top. However, according to the invention herein, the desired figure can be easily selected without changing their order.

Figure 9:
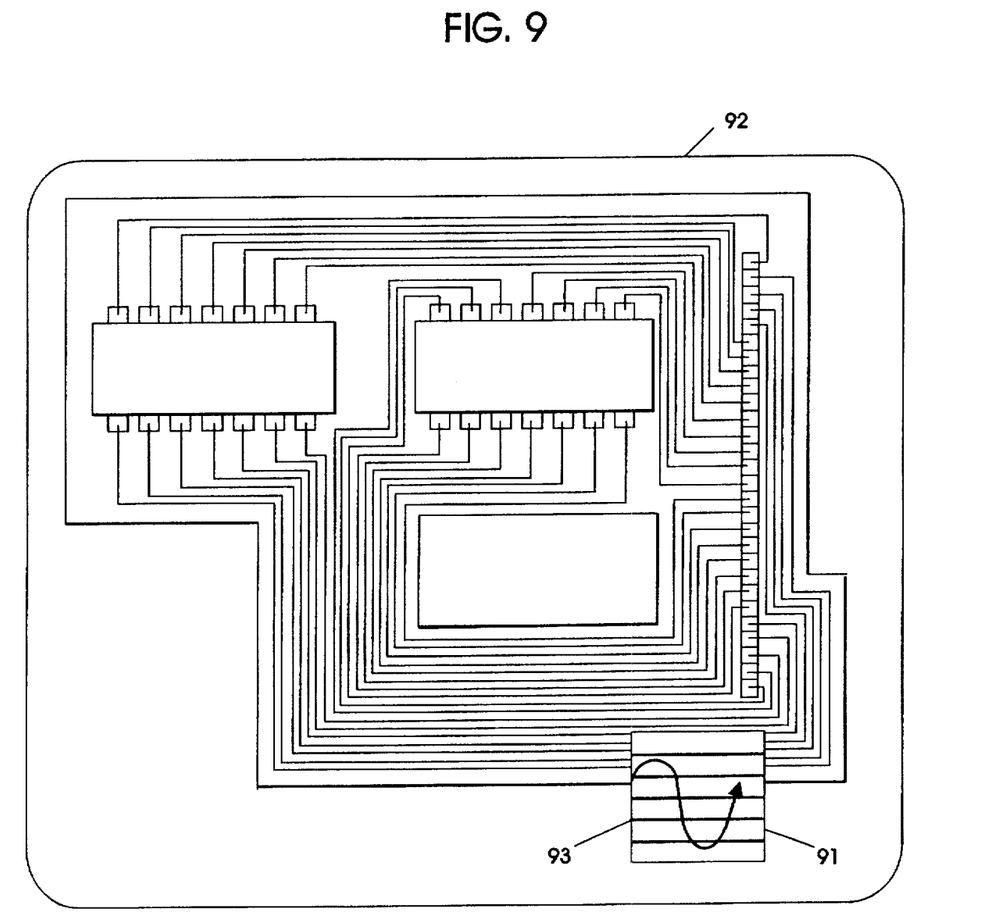
FIG. 9 is a schematic diagram showing movement of a pointer and highlighting of an edit object on the subscreen in another embodiment of the present invention.

FIG. 9 schematically shows movement of the pointer on the subscreen and highlighting of the edit objects in another embodiment of the present invention.

In this embodiment, a subscreen 91 is displayed as the position of the pointer specified on a main screen 92 or as a zoomed screen of the specified region. An information region 93 corresponds to a region in the zoomed screen where respective wiring is displayed. Then, wiring in the main screen corresponding to the wiring as an information region 93 which is pointed to by the pointer is highlighted by moving the pointer in the zoomed screen. The operator selects the desired wiring while confirming selection on the main screen.

The present invention changes the display of a corresponding edit object in the main screen which is the entire screen by moving the pointer in the zoomed screen. A simple zoomed screen of a predetermined region is simultaneously displayed in addition to an edit screen. The operator performs selection based on the information on an enlarged edit object in the zoomed screen which is a method commonly used in the conventional graphics applications. However, where similar edit objects such as the abovementioned wiring patterns are closely and similarly arranged, it is difficult in a conventional approach for the operator to distinguish the desired wiring in the enlarged screen from other wiring. On the contrary, according to this embodiment, since wiring corresponding to an information region in the zoomed screen which is pointed to by the pointer is displayed in a specific display state in the edit screen which indicates the entire situation, the desired edit object can be easily identified even when edit objects have similar shapes and are similarly arranged.

Furthermore, the information region including the wiring areas and the adjacent areas may be defined in such a manner that the borders of information regions contact each other. In addition, it is a matter of course that it may be displayed as a transparent subscreen only with contour.

According to the present invention, a desired edit object can be selected on a virtually zoomed subscreen from a plurality of edit objects arranged on the screen by confirming the entire arrangement while visually distinguishing the desired edit object from others. Because the edit object can be accurately selected with a simple operation, it is possible to improve the efficiency of an edit operation.

Although the present invention has been described with respect to a specific preferred embodiment thereof, various changes and modifications may be suggested to one skilled in the art, and it is intended that the present invention encompass such changes and modifications as fall within the scope of the appended claims.

We claim:

1. A method for selecting one of a plurality of edit objects displayed on a display screen, comprising the steps of:

displaying a plurality of edit objects on a main screen of said display screen;

moving a pointer displayed on said main screen to specify a desired position on said main screen;

if there exists a plurality of edit objects at said desired position or in a predetermined region based on said desired position, selecting edit objects at said desired position or in said predetermined region as selective candidates;

displaying a subscreen on said main screen, said subscreen having a plurality of information regions, each one of said plurality of information regions corresponding to a respective one of said selective candidates and wherein said information regions are provided in a number equal to those of said respective candidates;

moving a pointer on said subscreen by said input means;

changing a display of one of said edit objects on said main screen corresponding to one of said information regions indicated at said desired position on said subscreen; and specifying one of said information regions displayed on said subscreen by said input means, whereby one of said edit objects corresponding thereto is selected.

2. A method according to claim 1, wherein said subscreen is overlapped and displayed on said main screen.

3. A method according to claim 1, wherein said pointer can only move in said subscreen while said subscreen is displayed.

4. A method according to claim 3, wherein said subscreen comprises a pop-up menu.

5. A method according to claim 1, wherein a display of said one of said edit objects is changed on said main screen by highlighting the contour of said one of said edit objects.

6. A method according to claim 1, wherein a display of said one of said edit objects is changed on said main screen by changing a color of said one of said edit objects.

7. A method according to claim 1, wherein a size of said predetermined region varies with a magnification ratio of said main screen.

8. A method for selecting one of a plurality of edit objects displayed on a display screen, comprising the steps of:

displaying a plurality of edit objects on a main screen of said display screen;

moving a pointer displayed on said main screen so as to specify a desired position on said main screen;

if there exists a plurality of edit objects at said desired position or in a predetermined region based on said desired position, selecting edit objects at said desired position or in said predetermined region as selective candidates;

displaying a subscreen on said main screen, said subscreen comprised of a plurality of transparent tile-shaped information regions having only contour, respective ones of said information regions corresponding to respective ones of said selective candidates and wherein said information regions are provided in a number equal to those of said selected candidates;

moving a pointer on said subscreen by said input means;

changing a display of one of said edit objects on said main screen corresponding to one of said information regions indicated at said desired position on said subscreen, whereby an operator can recognize said corresponding one of said edit objects; and specifying one of said information regions displayed on said subscreen by said input means, whereby one of said edit objects corresponding thereto is selected.

9. A method according to claim 8, wherein said subscreen is overlapped and displayed on said main screen.

10. A method according to claim 8, wherein said pointer can only move in said subscreen while said subscreen is displayed.

11. A method according to claim 10, wherein said subscreen comprises a pop-up menu.

12. A method according to claim 8, wherein a display of said one of said edit objects is changed on said main screen by highlighting the contour of said one of said edit objects.

13. A method according to claim 8, wherein a display of said one of said edit objects is changed on said main screen by changing a color of said one of said edit objects.

14. A method according to claim 8, wherein a size of said predetermined region varies with a magnification ratio of said main screen.

15. A method according to claim 8, wherein each of said information regions is a rectangle with the same shape.

16. A method for selecting one of a plurality of edit objects displayed on a display screen, comprising the steps of:

displaying a plurality of edit objects on a main screen of said display screen;

moving a pointer displayed on said main screen so as to specify a desired position on said main screen;

if there exists a plurality of edit objects at said desired position or in a predetermined region based on said desired position, selecting edit objects at said desired position or in said predetermined region as selective candidates;

displaying a subscreen on said main screen, said subscreen comprising an enlarged screen of a position of said pointer specified on said main screen or a predetermined region based on said position, a plurality of information regions being displayed in said subscreen, respective ones of said information regions corresponding to respective ones of said selective candidates;

moving a pointer on said subscreen by said input means;

changing a display of one of said edit objects on said main screen corresponding to one of said information regions indicated at said desired position on said subscreen, whereby an operator can visually recognize a corresponding one of said edit objects on said main screen; and specifying one of said information regions displayed on said subscreen by said input means, whereby one of said edit objects corresponding thereto is selected.

17. A method according to claim 16, wherein said subscreen is overlapped and displayed on said main screen.

18. A method according to claim 16, wherein said pointer can only move in said subscreen while said subscreen is displayed.

19. A method according to claim 18, wherein said subscreen comprises a pop-up menu.

20. A method according to claim 16, wherein a display of said one of said edit objects is changed on said main screen by highlighting the contour of said one of said edit objects.

21. A method according to claim 16, wherein a display of said one of said edit objects is changed on said main screen by changing a color of said one of said edit objects.

22. A method according to claim 16, wherein a size of said predetermined region varies with a magnification ratio of said main screen.

23. A method according to claim 16, wherein said information regions are provided in a number equal to those of said selective candidates.

24. A method for selecting one of a plurality of adjacent edit objects displayed on a display screen, comprising the steps of:

displaying a plurality of edit objects on a main screen of said display screen;

moving a pointer displayed on said main screen so as to specify a desired position on said main screen;

if there exists a plurality of edit objects at said desired position or in a predetermined region based on said desired position, selecting edit objects at said desired position or in said predetermined region as selective candidates;

displaying a subscreen on said main screen, said subscreen comprising a plurality of adjacent information regions, said information regions corresponding to respective ones of said selective candidates, a shortest distance between any of said adjacent information regions being displayed as larger than a distance between two closest edit objects as said selective candidates displayed on said main screen;

displaying on said subscreen a pointer which can move in the region of said subscreen;

changing a display of one of said edit objects on said main screen corresponding to one of said information regions indicated at said desired position on said subscreen, whereby an operator can visually recognize a corresponding one of said edit objects; and specifying one of said information regions displayed on said subscreen by said input means, whereby one of said edit objects corresponding thereto is selected.

25. A method according to claim 24, wherein said subscreen is overlapped and displayed on said main screen.

26. A method according to claim 24, wherein said pointer can only move in the region of said subscreen while said subscreen is being displayed.

27. A method according to claim 26, wherein said subscreen is a pop-up menu.

28. A method according to claim 24, wherein a display of said one of said edit objects is changed on said main screen by highlighting the contour of said one of said edit objects.

29. A method according to claim 24, wherein a display of said one of said edit objects is changed on said main screen by changing a color of said one of said edit objects.

30. A method according to claim 24, wherein a size of said predetermined region varies with a magnification ratio of said main screen.

31. A method according to claim 24, wherein said information regions are provided in a number equal to those of said selective candidates.

32. An apparatus for selecting one of a plurality of edit objects displayed on a display screen, comprising:

means for displaying a plurality of edit objects on said display screen;

means for moving a pointer displayed on said display screen to a desired position and to specify said desired position;

storage means for determining whether a plurality of said edit objects exists at said desired position or in a predetermined region on said display screen based on said desired position, and, if there exists a plurality of said edit objects, means for selecting said edit objects at said desired position or in said predetermined region as selective candidates;

display means for displaying a pop-up menu on said display screen, said pop-up menu having an equal number of information regions corresponding to said selective candidates, said respective information regions corresponding to said respective ones of said selective candidates;

means for moving a pointer on said menu to enable an operator to recognize a corresponding edit object by changing a display of said edit object on said display screen corresponding to a respective one of said information regions according to said information regions displayed at said pointer position of said menu; and means for selecting said edit object corresponding to said specified information region by specifying any one of said information regions displayed on said menu.

* * * * *